March 10, 1959   H. BINDER ET AL   2,877,262
PROCESS FOR THE PRODUCTION OF THE GLYCOL ESTER OF
TEREPHTHALIC ACID SUITABLE FOR POLYMERIZATION
Filed April 13, 1956
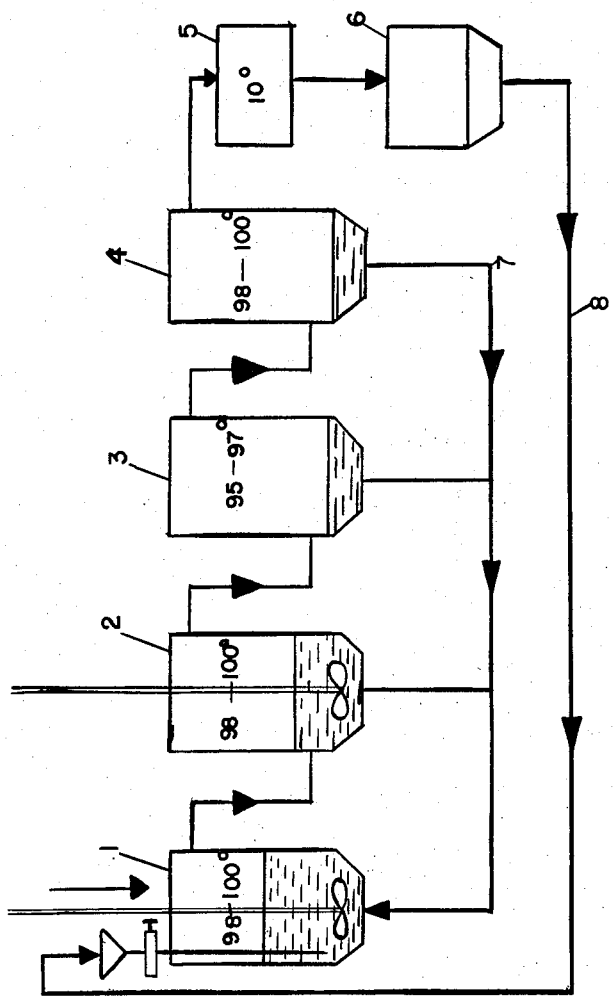
HANS BINDER
EUGEN BULLINGER
    INVENTOR.
BY *Connolly and Hutz*
ATTORNEYS

United States Patent Office 2,877,262
Patented Mar. 10, 1959

2,877,262

PROCESS FOR THE PRODUCTION OF THE GLYCOL ESTER OF TEREPHTHALIC ACID SUITABLE FOR POLYMERIZATION

Hans Binder and Eugen Bullinger, Rottweil (Neckar), Germany, assignors to Rottweiler Kunstseidefabrik Aktiengesellschaft, Rottweil (Neckar), Germany, a corporation of Delaware Application April 13, 1956, Serial No. 589,842

Claims priority, application Germany April 19, 1955

5 Claims. (Cl. 260—475)

This invention relates to the preparation of a terephthalic acid glycol ester used in the production of polyethylene terephthalate, and it particularly relates to the production of the bis-glycol ester.

This is a continuation-in-part of application S. N. 568,150, filed February 28, 1956.

In the aforementioned patent application there is described a process wherein the bis-glycol ester of the terephthalic acid is produced in a high degree of purity by means of the direct esterification of ethylene glycol with terephthalic acid, whereby the isolation of the ester, after the distilling off of the glycol excess, is effected by pouring the as yet still liquid raw ester into hot water; the quantity of the hot water being determined by the solubility of the raw ester. In this manner, the bis- and the accompanying mono-glycol ester remain in the solution, while the already-formed precondensation products, in addition to the inorganic and a portion of the organic impurities, predominately digylcol esters, precipitate out and can be separated. During the cooling of the mother liquor, the bis- and mono-glycol esters crystallize out in a high degree of purity, while the very undesirable diglycol esters substantially all remain in the aqueous solution.

It has now been found that the degree of purity of the valuable bis- and mono-glycol esters can be improved if salt solutions are used instead of pure water since, in this manner, the solubility differences between the glycol esters and the diglycol esters of the terephthalic acid are even more differentiated from each other. These salt solutions may be maintained at a temperature of between about 80° C. to about 100° C. Preferably, however, they should be maintained at a temperature of about 98° C. Of the salts which are readily soluble in water, the salts of the alkali metals and ammonium have proven most suitable, and this is especially true of the chlorides and primary alkali and ammonium phosphates. When heated, these salts in only an 8 to 10% solution, are capable of dissolving considerable quantities of the bis-glycol terephthalate. On the other hand, the solubility of this terephthalate in these salt solutions, when the solutions are at a temperature of about 10° C., amounts to no more than about ½%, and is generally much less. In contrast, in the corresponding sulfates, under equal conditions, the solubility of the bis-glycol ester is far smaller, necessitating the use of an undesirably large quantity of the salt. The results, when using sulfates of bivalent metals, are the same or even worse.

The following table illustrates the respective solubilities of the most suitable salts usable with the bis-glycol ester. This table shows the various solubility values at three different concentrations for each salt with the temperatures maintained at, first 98° C. and then at 10° C., while in the last column, there are listed the solubility values of bis-di-glycol ester at 98° C.

| Type of salt | Content in percent of salt solution | Solubility of bis-glycol ester in a 100 g. salt solution at 98° C. | Solubility of bis-glycol ester in a 100 g. salt solution at 10° C. | Solubility of bis-di-glycol ester in a 100 g. salt solution at 98° C. |
|---|---|---|---|---|
| Ammonium chloride | 8<br>10<br>12 | 17.4<br>16.34<br>8.50 | cannot be determined since solubility too small. | 4.30<br>3.40<br>2.84 |
| Potassium chloride | 8<br>10<br>12 | 18.28<br>12.24<br>7.93 | 0.58<br>0.54<br>0.46 | 5.40<br>3.26<br>2.78 |
| Sodium chloride | 8<br>10<br>12 | 12.15<br>8.54<br>5.40 | 0.42<br>0.40<br>0.26 | 4.10<br>3.42<br>2.60 |
| Primary ammonium phosphate | 8<br>10<br>12 | 9.63<br>5.10<br>4.24 | cannot be determined since the solubility is too small. | 2.85<br>2.54<br>2.35 |

As can be seen from the above table, the diglycol esters, which are readily highly soluble in water, do not by any means, attain the same concentrations as the bis-glycol ester, and remain, therefore, as undissolved and easily separated oily impurities. The most suitable salts have proven to be ammonium chloride and potassium chloride in a 10% solution at 98° C.

If the substantially pure bis-glycol ester, produced by the present process, is treated with a small amount of mono-glycol ester, as it precipitates, according to the process of the parent application, it is only necessary to deal with the remaining small quantities of diglycol esters. It is not necessary that the purifying or isolating process precede the present process but the present process may be applied to the already-purified product.

The entire purification and isolating process can be carried out according to the herein described invention, whereby it is not necessary to have a pre-purifying step. The raw ester, as it precipitates out after the distilling-off of the glycol excess, is immediately subjected to the herein-described purifying process. In addition to the diglycol esters, there also precipitate out in the hot salt solutions, such hot-water-insoluble pre-condensation products as are described in the parent application. These latter precipitates can be separated, together with the other impurities, after a certain time for settling has been allowed.

As has been indicated above, the process of this invention is similar to that of co-pending application, S. N. 568,150 except that salt solutions are substituted for the hot water. The following example serves to illustrate this improved process.

*Example*

In an autoclave, 160 grams of relatively impure terephthalic acid is heated together with 120 grams of ethylene glycol for about one and one-half hours at a temperature of about 240° C. After about one hour of continuous heating, without any interruption of the heating, the water formed by the reaction is evaporated out. After this first heating step, 955 grams of glycol, which has been previously heated to about 180° C., is inserted into the autoclave and a further heating, at about 220° C., takes place for about one hour.

The reaction product in the autoclave is then cooled to about 125° C. and, at this temperature, the excess glycol is vacuum-distilled off. The remaining liquid mass is, thereafter, poured into a 10% potassium chloride solution at a temperature of about 98° C., this mixture being then cooled to about 50° C.

By means of centrifuging or filtering, those condensation products which are insoluble under these conditions, and which have melting points of between about 160 and 186° C., are separated off while the residue is collected and converted into bis-glycol ester by means of heating together, at about 230° C. during a period of about one hour, with about 5 to 7 times that amount of glycol which is theoretically necessary to form bis-glycol-terephthalate.

The resulting product is then cooled, by stirring, to about 10° C., at which time the bis- and mono-glycol esters of the terephthalic acid crystallizes out in the form of colorless crystals. These crystals are then re-washed with a little cold water and vacuum-dried at about 80° C.

Since this is actually a process for the extraction of the valuable raw constituents of the raw product, the process is best carried out continuously, as illustrated schematically in the single figure of the drawing.

Referring now in greater detail to the drawing, there are shown two solvent containers 1 and 2 which are connected in series, and which are each provided with an agitator. Container 1 is filled with the raw ester or the pre-purified bis-glycol ester which is suspended, by means of stirring, in a 10% potassium chloride solution at a temperature of between 98 and 100° C. The extraction of the bis-glycol ester is completely accomplished in container 2. From here the solution containing the impurities suspended therein, flows into container 3 which is heated to a temperature of 95–97° C., where more impurities are precipitated out. The remaining impurities are precipitated out in container 4, maintained at 98–100° C. From container 4 it flows off into the crystallization container 5 maintained at 10° C. The motor liquor is then, after being re-heated to between 98–100° C., recycled through the pipe 8 into the solvent container 1. Likewise, the impurities from the containers 2 to 4 can also be recycled through the back-flow pipe 7 to container 1, for the purpose of dissolving out the last residues of bis-glycol ester. From time to time during the process, the impurities, which are present mainly in the form of a brown oil, are discharged and can be worked up through a two-hour heating with water, at a temperature of 240–250° C., to pure terephthalic acid, as in the parent application.

The glycol esters, purified in accordance with this process, furnish polycondensates having melting points of over 260°.

Obviously many modifications and variations of the present invention are possible in the light of the above teachings. It is, therefore, to be understood that within the scope of the appended claims the invention may be practiced otherwise than as specifically described.

What is claimed is:

1. A process for the production of terephthalic acid glycol ester which comprises reacting terephthalic acid with glycol at a temperature of about 220° C. to about 240° C., the addition of the glycol taking place in two steps, wherein one portion of the glycol is added for an initial reaction with the terephthalic acid during which reaction water is formed, cooling the reaction products of the initial reaction to a temperature under the boiling point of the glycol, removing said water in the form of steam, adding the second portion of the glycol, re-heating the mixture, cooling to a temperature of about 125° C., distilling off excess glycol, pouring the liquid residue into a water-soluble salt solution maintained at a temperature between about 80° C. and 100° C., whereby insoluble condensation products precipitate out cooling to about 50° C., selectively removing the insoluble condensation products, heating the residue together with about 5 to 7 times the amount of glycol theoretically necessary to form bis-glycol-terephthalate and cooling said residue to about 10° C., at which time the monomeric terephathalic acid glycol ester crystallizes out.

2. The proces of claim 1 wherein the salt of the salt solution is a member of the group consisting of the alkali metal and ammonium salts.

3. The process of claim 1 wherein the salt of the salt solution is a member of the group consisting of ammonium chloride, potassium chloride, sodium chloride and primary ammonium phosphate.

4. The process of claim 1 wherein the temperature of the salt solution is about 98° C.

5. The process of claim 1 wherein the process is continuous and the mother liquor and impurities are recycled back through the system.

References Cited in the file of this patent

UNITED STATES PATENTS

| | | |
|---|---|---|
| 2,465,319 | Whinfield et al. | Mar. 22, 1949 |
| 2,643,989 | Auspos et al. | June 30, 1953 |

OTHER REFERENCES

Shorland: J. Am. Chem. Soc., 57, 115 to 116 (1935).

Millard: "Phy. Chem. for Colleges," p. 407, McGraw-Hill, 1946.